United States Patent
Croucher (10) Patent No.: US 11,181,708 B2
(45) Date of Patent: Nov. 23, 2021

(54) FIBER MANAGEMENT CASSETTE

(71) Applicant: Prysmian S.p.A., Milan (IT)

(72) Inventor: Benjamin Croucher, Southampton (GB)

(73) Assignee: Prysmian S.p.A., Milan (IT)

( * ) Notice: Subject to any disclaimer, the term of this patent is extended or adjusted under 35 U.S.C. 154(b) by 0 days.

(21) Appl. No.: 16/676,831

(22) Filed: Nov. 7, 2019

(65) Prior Publication Data

US 2020/0150372 A1    May 14, 2020

(30) Foreign Application Priority Data

Nov. 8, 2018 (IT) .......................... 102018000010170

(51) Int. Cl.
    *G02B 6/44*      (2006.01)

(52) U.S. Cl.
    CPC ................................ *G02B 6/4453* (2013.01)

(58) Field of Classification Search
    CPC .................................................. G02B 6/4453
    See application file for complete search history.

(56) References Cited

U.S. PATENT DOCUMENTS

| | | | |
|---|---|---|---|
| 5,689,606 A | 11/1997 | Hassan | |
| 6,081,645 A | 6/2000 | Dotzer et al. | |
| 6,112,006 A | 8/2000 | Foss | |
| 8,913,868 B2 * | 12/2014 | Hangebrauck | G02B 6/4454 385/135 |
| 9,291,788 B2 | 3/2016 | Rudenick et al. | |
| 2004/0042755 A1 | 3/2004 | Vincent et al. | |
| 2007/0092195 A1 | 4/2007 | Solheid et al. | |
| 2010/0260464 A1 | 10/2010 | Ayme et al. | |
| 2012/0230645 A1 | 9/2012 | Marmon et al. | |
| 2015/0370025 A1 * | 12/2015 | Wells | G02B 6/4452 385/135 |
| 2020/0150372 A1 | 5/2020 | Croucher | |
| 2020/0150373 A1 | 5/2020 | Croucher | |

FOREIGN PATENT DOCUMENTS

| | | |
|---|---|---|
| DE | 4438668 A1 | 5/1996 |
| EP | 3215668 A2 | 3/1987 |
| NL | 2008155 C2 | 7/2013 |
| WO | 2018/185136 A1 | 10/2018 |

OTHER PUBLICATIONS

Search Report in counterpart Italian Application No. 201800010170 dated Jun. 27, 2019, pp. 1-2.

* cited by examiner

*Primary Examiner* — Charlie Y Peng
(74) *Attorney, Agent, or Firm* — Additon, Pendleton & Witherspoon, P.A.

(57) ABSTRACT

A fiber management cassette for storing loops of one or more optical fiber elements is disclosed. An exemplary cassette includes a first module comprising a first portion of a winding area and first fixing elements and a second module comprising a second portion of the winding area and second fixing elements. The first fixing elements are configured to engage with the second fixing elements for releasably interconnecting the first module and the second module and to join the first portion and the second portion to form the winding area, which is configured to store the loops of one or more optical fiber elements. The first module comprises a fiber passageway allowing the optical fiber elements to enter and exit the cassette.

16 Claims, 6 Drawing Sheets

FIBER MANAGEMENT CASSETTE

CROSS-REFERENCE TO PRIORITY APPLICATION

This application claims the benefit of pending Italian Application No. 102018000010170 (filed Nov. 8, 2018, at the Italian Patent and Trademark Office), which is hereby incorporated by reference in its entirety.

FIELD OF THE INVENTION

The present invention relates to the field of optical access networks. In particular, the present invention relates to a fiber management cassette for storing loops of optical fiber elements, in particular for an optical joint closure of an optical access network.

BACKGROUND

As known, in an optical access network, optical joint closures are provided to house the splices between the optical fiber elements of the cables that are routed across the network, and to protect them from dirt, humidity, stresses, etc. The optical joint closures may be capable of accommodating a wide variety of cables (such as, e.g., loose tubes, central loose tubes, FLEXTUBE cables, blown fibers), and they may be provided in different sizes depending on the splice capacity that is required.

An optical joint closure typically comprises a number of splice trays for storing the splices connecting the optical fiber elements of one or more network cables to respective optical fiber elements of other network cables or to the fibers of the optical cables going to the final users. Moreover, an optical joint closure also stores the loops of optical fiber elements from the cables entering and exiting the joint closure.

The length of optical fiber elements that must be stored in an optical joint closure for mid-span access typically depends on the size and location of the optical joint closure. When loops of optical fiber elements are stored without any support, the fiber elements may become entangled, or they may form loops having a bend radius that is smaller than the minimum allowed bend radius, which causes excessive attenuation in the optical fiber elements.

Examples of devices capable of supporting extra lengths of optical fibers are disclosed in the documents listed herein below.

U.S. Patent Publication No. 2004/0042755, which is hereby incorporated by reference in its entirety, discloses a modular cassette for coiling and holding splices between conductors, the cassette comprising: a base module substantially occupying a plane, the module having a conductor entry passage leading to first conductor coiling means and first holding means for holding splices between conductors; second conductor coiling means; and a first additional module receiving conductors, the additional module substantially occupying the same plane as the base module and being secured to the base module by releasable connection means. The base module of U.S. Patent Publication No. 2004/0042755 contains said second coiling means and the first additional module contains holding means for holding connections being conductors.

U.S. Patent Publication No. 2007/0092195, which is hereby incorporated by reference in its entirety, discloses a slack storage tray for managing slack associated with fiber terminations in a distribution cabinet. The storage tray includes a base defining a cable pathway for storing multiple loops of a cable. A hinged cover further defines a cable pathway for managing the cable.

U.S. Patent Publication No. 2010/0260464, which is hereby incorporated by reference in its entirety, discloses a device for storing an excess length of at least one optical fiber or some other type of cable, the device comprising two separate guide members configured to guide a portion of at least one optical fiber or one cable, each guide member presenting a periphery that is substantially perpendicular to a plane in a travel direction, said periphery including in a fraction of its outline a groove that is suitable for receiving a portion of at least one optical fiber or one cable, said groove being defined by at least one curved portion having at least a radius of curvature that is greater than the minimum radius of curvature that is acceptable for the fiber or the cable; and the relative position of said guide members in said plane being adjustable with the help of at least one longitudinal part extending parallel to the travel direction and having a first end and a free second end, said first end being secured to one of the guide members, said longitudinal part being suitable for being fastened to the other guide member from the free second end of said part and being capable of being moved relative to said other guide member while remaining fastened thereto, whereby adjustment of the relative position of said guide members enables the surplus length of said fiber or said cable to be stored on said guide members.

SUMMARY

The Applicant perceived the need to provide a fiber management cassette for storing loops of optical fiber elements that is modular and may be adapted to fit different lengths of the optical fiber elements that should be stored therein.

Accordingly, the Applicant has tackled the problem of providing a fiber management cassette for storing loops of optical fiber elements, which comprises a modular winding area capable of fitting different lengths of optical fiber elements over a potentially unpredictable range. This would allow installing the fiber management cassette in the optical joint closures of varying size currently available on the market and also in larger optical joint closures that may be available on the market in the future.

In one exemplary aspect, the present invention relates to a fiber management cassette for storing loops of one or more optical fiber elements, the cassette comprising: a first module comprising a first portion of a winding area and first fixing elements; and a second module comprising a second portion of the winding area and second fixing elements; wherein the first fixing elements are configured to engage with the second fixing elements for releasably interconnecting the first module and the second module and join the first portion and the second portion to form the winding area, the winding area being configured to store the loops of one or more optical fiber elements, and wherein the first module comprises a fiber passageway allowing the optical fiber elements to enter and exit the cassette.

According to exemplary embodiments of the present invention, the fiber management cassette further comprises a third module comprising: a third portion of the winding area; further first fixing elements; further second fixing elements, wherein the further first fixing elements are configured to engage with the first fixing elements for releasably interconnecting the third module and the first module and join the first portion and the third portion of the winding area, and the further second fixing elements are configured to engage with the second fixing elements for releasably interconnecting the third module and the second module and join the third portion and the second portion of the winding area.

In an exemplary embodiment, the first fixing elements comprise: first clip components arranged at a first end of a free edge of the first module; second clip components arranged at a second end of the free edge; third clip components arranged at the middle of the free edge; and the second fixing elements comprise: first clip components arranged at a first end of a free edge of the second module and configured to engage with the first clip components of the first module to form a first clip when the first module and the second module are releasably interconnected; second clip components arranged at a second end of the free edge of the second module and configured to engage with the second clip components of the first module to form a second clip when the first module and the second module are releasably interconnected; third clip components arranged at the middle of the free edge of the second module and configured to engage with the third clip components of the first module to form a third clip when the first module and the second module are releasably interconnected.

In an exemplary embodiment, the first clip components and the second clip components of the first module each comprise a respective hook and a respective recess forming a respective slot at a respective free end of a sidewall of the first module, and the first clip components and the second clip components of the second module each comprise a respective elongated fastener at a respective free end of a sidewall of the second module, the respective elongated fastener being configured to engage with the respective slot of the first module.

In an exemplary embodiment, the first clip components and the second clip components of the first module each comprise a respective hole in the sidewall of the first module in the proximity of a free end thereof, and the first clip components and the second clip components of the second module each comprise a respective hook projecting from a respective free end of the sidewall of the second module, the respective hook being configured to engage with the respective hole of the first module.

In an exemplary embodiment, the first module comprises a first portion of a mandrel for routing the optical fiber elements in the winding area, and the second module comprises a second portion of the mandrel, the mandrel being formed once the first module and the second module are releasably interconnected by the first fixing elements and the second fixing elements.

In an exemplary embodiment, the third clip components of the first module comprise one or more elongated fasteners located on an outer flat surface of the first portion of the mandrel and projecting outwards, and the third clip components of the second module comprise one or more elongated slots formed in an outer flat surface of the second portion of the mandrel and are configured to engage with the one or more elongated fasteners of the first module.

In an exemplary embodiment, the further first fixing elements comprise first clip components, second clip components, and third clip components corresponding to, respectively, the first clip components, the second clip components, and the third clip components of the second module, and the further second fixing elements comprise first clip components, second clip components, and third clip components corresponding to, respectively, the first clip components, the second clip components, and the third clip components of the first module.

In an exemplary embodiment, the first module and the second module comprise retaining tabs configured to retain the loops of optical fiber elements in the winding area.

In an exemplary embodiment, the first module comprises, at the fiber passageway, an anti-pull tab projecting from a sidewall of the first module towards the first portion of the winding area, the anti-pull tab being configured to retain portions of the optical fiber elements entering and exiting the fiber management cassette through the fiber passageway.

In an exemplary embodiment, the anti-pull tab comprises, at a free end thereof, a leg protruding towards a bottom surface of the fiber passageway.

In an exemplary embodiment, the first module comprises, in the proximity of the fiber passageway, a pivot element to pivot the fiber management cassette around a pivot axis perpendicular to a bottom surface of the fiber management cassette.

In an exemplary embodiment, the first module and the second module are made of plastic material.

In a further exemplary aspect, the present invention relates to an optical joint closure comprising a fiber management cassette as set forth above, wherein the fiber management cassette is connected to a frame of the optical joint closure by the pivot element.

Preferably, the second module of the fiber management cassette comprises a rotation lock to lock the fiber management cassette in a storage position when rotated into the optical joint closure by the pivot element.

The foregoing illustrative summary, as well as other exemplary objectives, properties, and/or advantages of the invention, and the manner in which the same are accomplished, are further explained within the following detailed description and its accompanying drawings.

BRIEF DESCRIPTION OF THE DRAWINGS

The drawings are provided as examples, may be schematic, and may not be drawn to scale. The present inventive aspects may be embodied in many different forms and should not be construed as limited to the examples depicted in the drawings. The present invention will become fully clear by reading the following detailed description, to be read by referring to the accompanying drawings, wherein:

FIG. 1b is a plan view of the first module of FIG. 1a;

FIG. 2b is a plan view of the second module of FIG. 2a;

FIG. 3b is a plan view of the third module of FIG. 3a;

DETAILED DESCRIPTION

In the present description and claims, unless otherwise specified, all the numbers and values should be intended as preceded by the term "about." Also, all ranges include any combination of the maximum and minimum points disclosed and include any intermediate ranges therein, which may or may not be specifically enumerated herein.

In an exemplary aspect, the present invention embraces a fiber management cassette comprising at least one first module and at least one second module that can be detachably connected together to form a modular assembly comprising a winding area configured to accommodate loops of optical fiber elements, as it will be described hereinafter with reference to the exemplary modules shown in the figures. The modular cassette according to the present invention may comprise one or more further modules configured to be connected between the first module and the second module to widen the winding area of the cassette, according to embodiments that will be better described herein. Addition of these further modules may potentially extend the modular assembly to accommodate loops of optical fiber elements of unpredictable, different sizes. In this way, the modular cassette may advantageously be fit to a wide variety of optical joint closures of different sizes. The fiber management cassette according to the present invention is also assembled in a very simple manner allowing it to be adjustable to fit the optical fiber element loop length directly on the field during installation.

As used herein, fiber element means an optical fiber, one or more optical fibers encapsulated in a protective buffer coating, or one or more optical fibers surrounded by a flexible sheath or wrapping.

The skilled person will appreciate that the modules shown in the figures and described hereinafter are exemplary embodiments of the invention that are configured to be pivotally arranged in an optical joint closure. However, use of the fiber management cassette according to the present invention is not limited to pivotally arranged modules in optical joint closures. For instance, the fiber management cassette according to the present invention may be used in racks housing active equipment that receives or transmits optical signals.

Figure 3A:
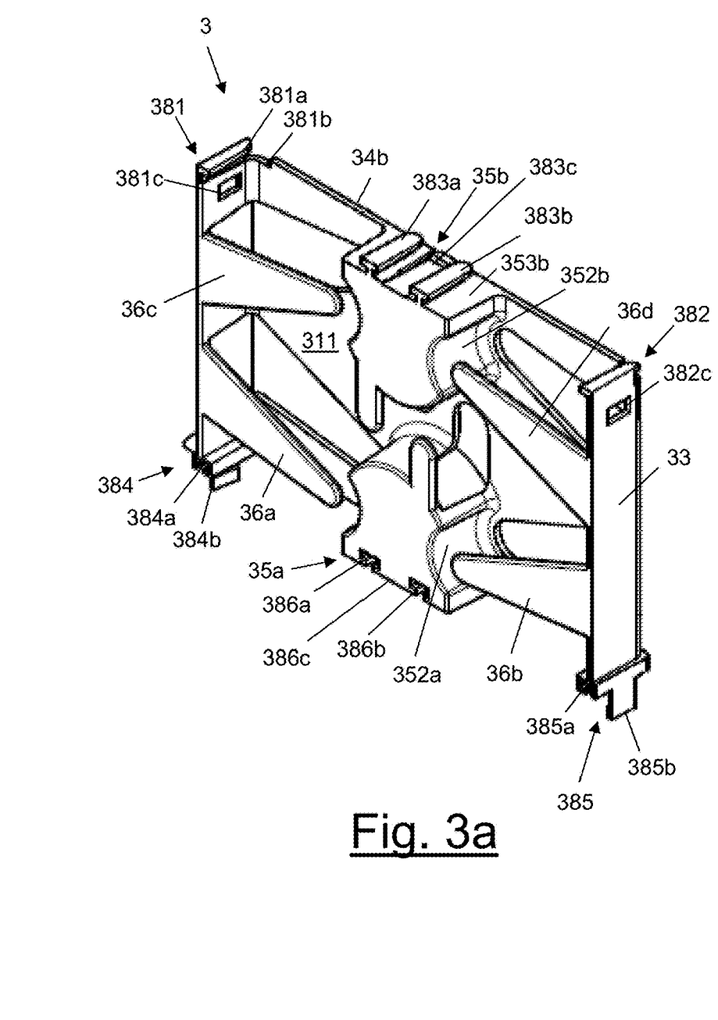
FIG. 3a is an axonometric view of a third module of the fiber management cassette according to an exemplary embodiment of the present invention.
Figure 3B:
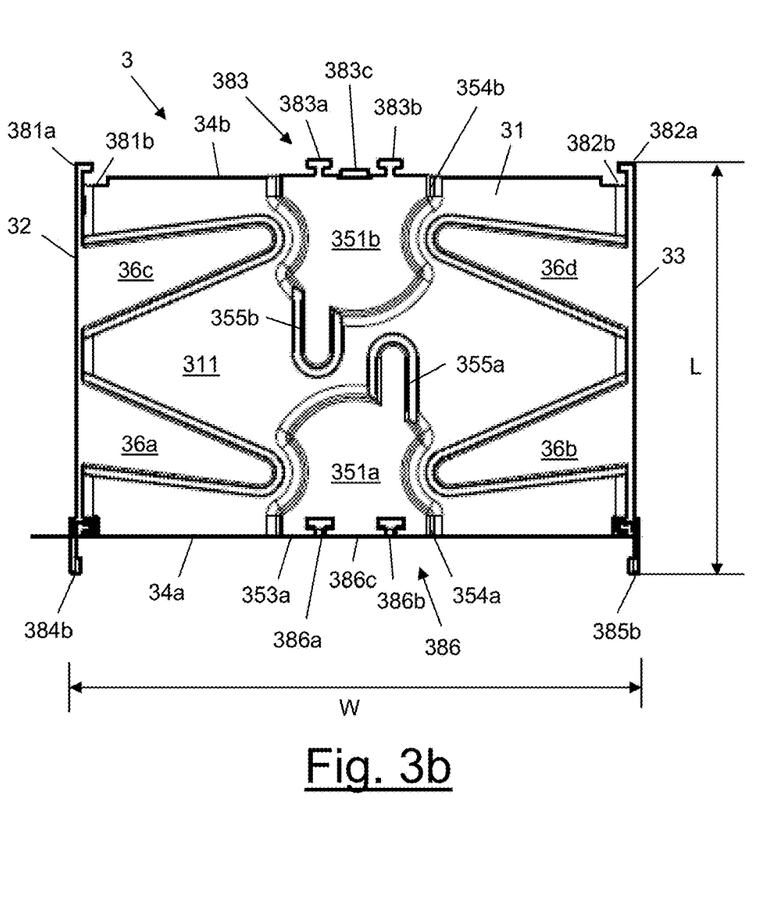
Figure 4:
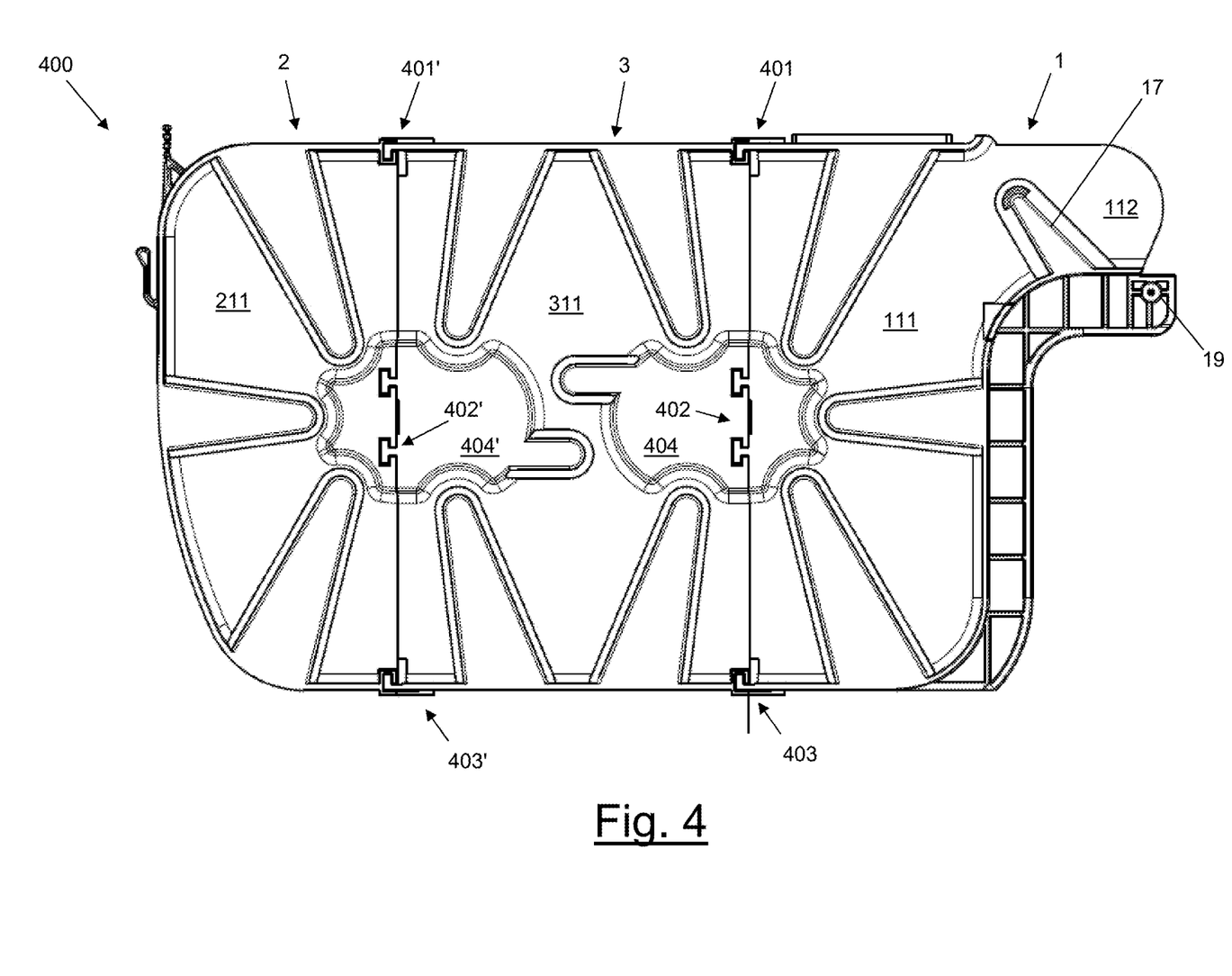
FIG. 4 is a plan view of a fiber management cassette according to an exemplary embodiment of the present invention.
Figure 5:
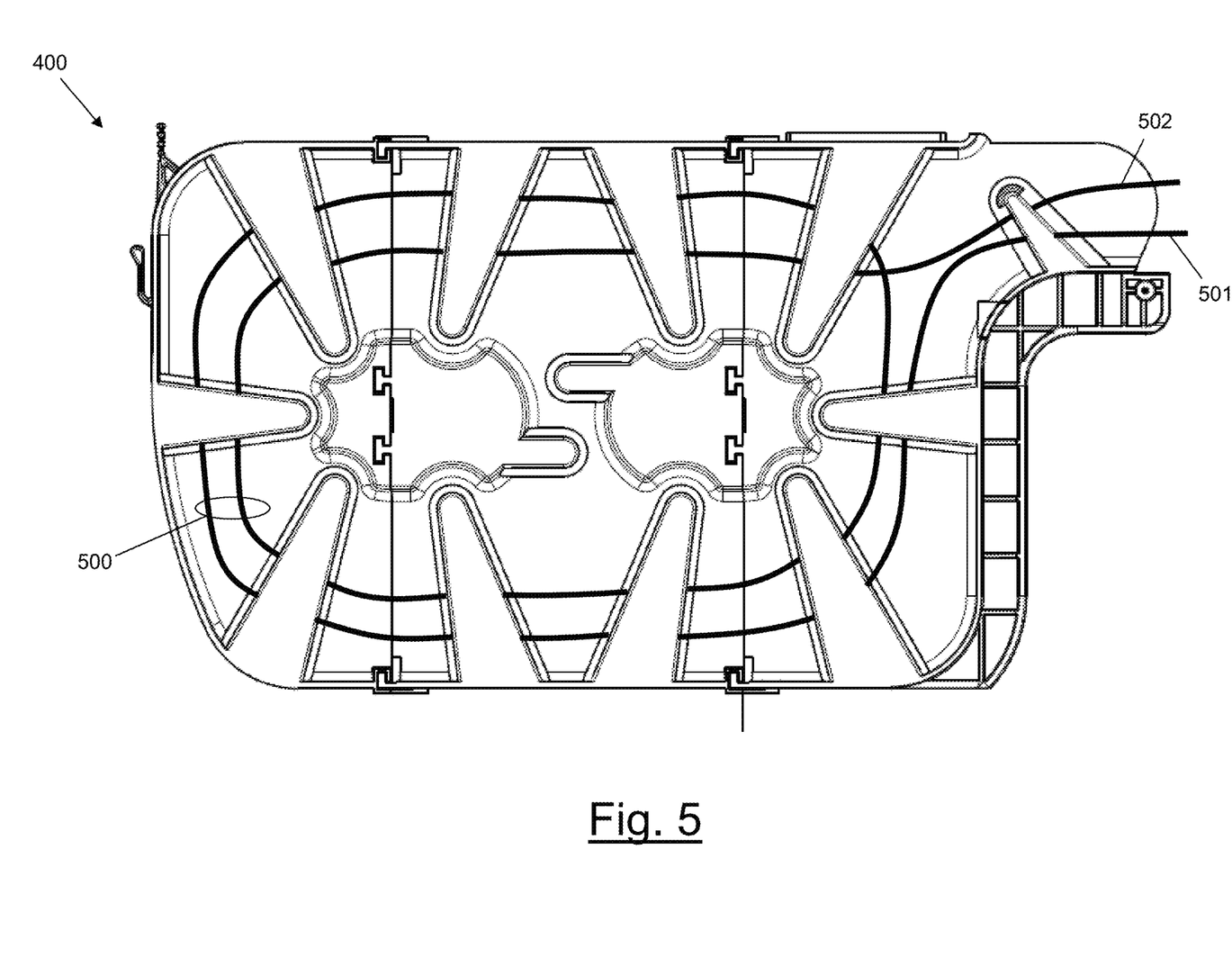
FIG. 5 is a plan view of the fiber management cassette of FIG. 4 illustrating an exemplary arrangement of optical fiber element loops inside the cassette.

FIGS. 1a, 1b, and FIGS. 2a, 2b schematically show a first module 1 and a second module 2, respectively, of a fiber management cassette according to an exemplary embodiment of the present invention. FIGS. 3a and 3b show a third module that may be optionally arranged between the first module and the second module to extend the size of the cassette. Besides, a fiber management cassette comprising the first module 1, the second module 2, and one third module 3 is shown in FIGS. 4 and 5. This cassette may be adapted to be arranged in a pivotable manner inside an optical joint closure (see FIG. 6), as it will be clearer hereinafter.

Figure 1A:
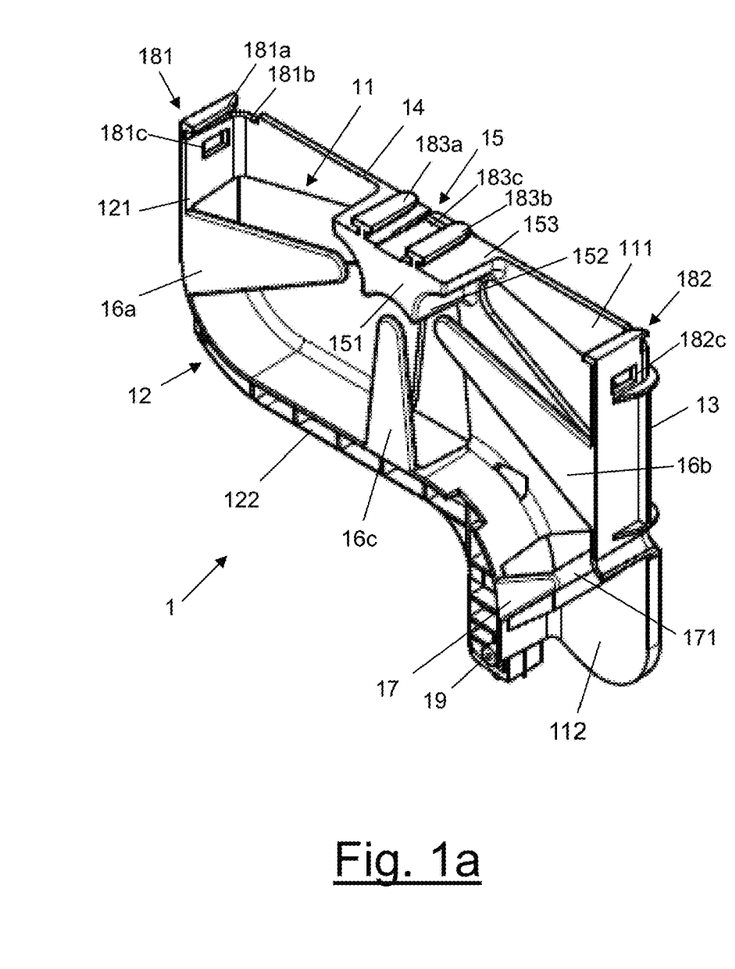
FIG. 1a is an axonometric view of a first module of the fiber management cassette according to an exemplary embodiment of the present invention.
Figure 1B:
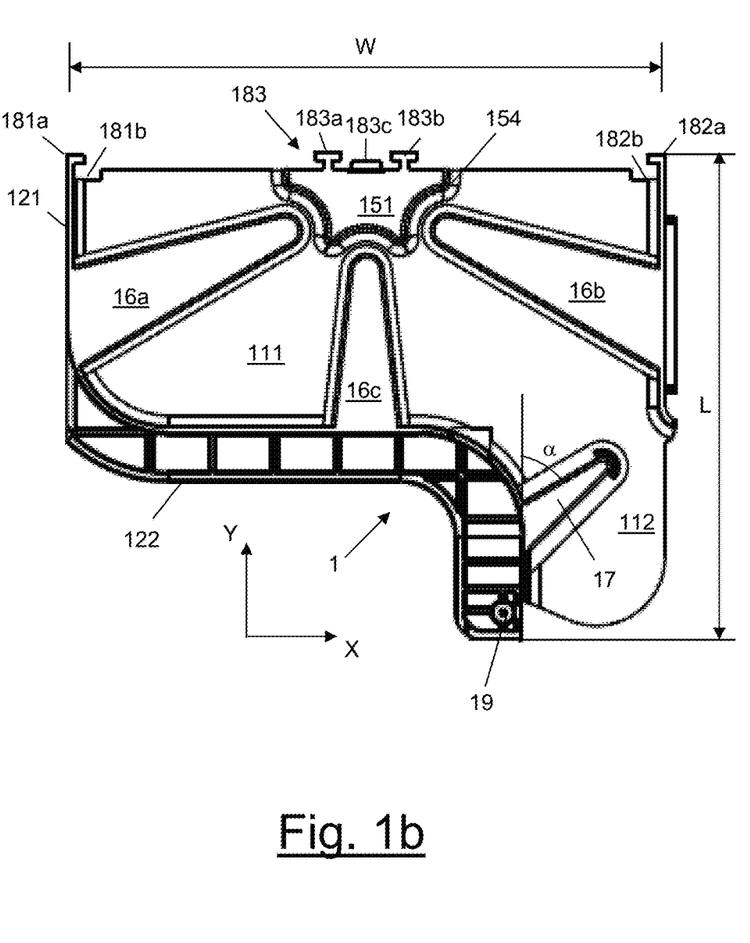

FIG. 1b also shows a Cartesian coordinate system with an X-axis and a Y-axis that will be used in the description herein below. Throughout this description, the "width" corresponds to a dimension along a direction parallel to the X-axis, the "length" corresponds to a dimension along a direction parallel to the Y-axis, and the "height" corresponds to a dimension along a direction parallel to the Z-axis, which is perpendicular to the XY-plane.

The first module 1, for example, comprises a substantially flat bottom surface 11, a first sidewall 12, and a second sidewall 13. It further comprises a substantially straight free edge 14 (i.e., an edge that is free from any wall) along which the first module 1 may be connected to the second module or to the third module, as it will be described hereinafter.

The first sidewall 12 shown in FIGS. 1a and 1b is S-shaped and comprises a first straight lateral portion 121 and second portion 122 in turn comprising a straight part between two curved parts. The curved parts may have a bend radius greater than a minimum bend radius, which depends on the type of optical fibers to be housed in the cassette. For example, subcategory ITU-T G.657.A1 fibers (see ITU-T G.657 Recommendation, "Characteristics of a bending-loss insensitive single-mode optical fiber and cable" October 2012, page 1) may provide a minimum bend radius equal to about 10 mm, while subcategory ITU-T G.657.A2 fibers may provide a minimum bend radius equal to about 7.5 mm. The radius of the curved parts of the second portion 122, for example, is greater than 15 mm. The second portion 122 of the first sidewall 12, for example, may have a pre-determined thickness, which may vary along the second portion 122.

The second sidewall 13 comprises a straight lateral portion, which is located opposite the first straight lateral portion 121 of the first sidewall 12 as separated by the width of the first module 1.

The first module 1 comprises a first portion 111 of a winding area of the cassette and a fiber passageway 112 adjacent to said first portion 111 of the winding area. The first portion 111 of the winding area, for example, may have a bottom surface with a substantially rectangular shape and a round corner, which corresponds to a curved part of the first sidewall 12. The first portion 111 of the winding area is delimited, along one of its major sides, by the free edge 14. The straight lateral portion 121 of the first sidewall 12 and the straight lateral portion of the second sidewall 13, for example, delimit the first portion 111 of the winding area at its minor sides.

The first portion 111 of the winding area, for example, comprises a portion 15 of a mandrel, which is positioned at the free edge 14 of the first module 1 substantially in the middle thereof. The mandrel is suitable for routing optical fiber elements in said winding area. The portion 15 of the mandrel comprises an upper surface 151, an outer lateral wall 152, and an outer flat surface 153, the latter being located at the free edge 14 of the first module. In the exemplary embodiment shown in FIGS. 1a and 1b, the upper surface 151 of the portion 15 of the mandrel is delimited by an edge 154, which comprises a first portion that is shaped substantially in the form of a number (e.g., three) of arcs of a circle, and a second straight portion at the free edge 14 of the first module. The outer lateral wall 152 of the portion 15 of the mandrel comprises a number (e.g., three) of elongated grooves extending along the height of the first portion of the mandrel and corresponding to the arcs of a circle along the edge 154 of the upper surface of the mandrel.

In an exemplary embodiment, the first module 1 further comprises retaining tabs, such as flexible retaining tabs, configured to retain loops of optical fiber elements. When the loops of optical fiber elements are arranged in the cassette, in particular in the winding area, they are arranged below the retaining tabs, which can be pulled away to let the optical fiber elements pass underneath.

In particular, in the exemplary embodiment shown in FIGS. 1a, 1b, the first module 1 comprises a first retaining tab 16a extending from the first straight lateral portion 121 of the second sidewall 12, a second retaining tab 16b extending from the straight lateral portion of the second sidewall 13, and a third retaining tab 16c extending from the straight part of the second portion 122 of the first sidewall 12. The retaining tabs 16a, 16b, 16c extend, for example, from the sidewalls 12, 13 of the first module 1 towards the portion 15 of the mandrel. Each retaining tab 16a, 16b, 16c extends, for example, from the respective sidewall towards a corresponding groove of the outer lateral wall 152 of the portion 15 of the mandrel so that the free end of each retaining tab 16a, 16b, 16c terminates in the proximity of said groove.

The retaining tabs 16a, 16b, 16c are flat and extend parallel to the bottom surface of the first portion 111 of the winding area. Additionally, the retaining tabs 16a, 16b, 16c are located, for example, at substantially the same height as the upper surface 151 of the portion 15 of the mandrel. In an exemplary embodiment, openings shaped in the same way as the retaining tabs are provided in the bottom surface of the first portion 111 of the winding area of the first module.

The fiber passageway 112 is a portion of the first module 1 extending from the first portion 111 of the winding area at a corner thereof. As shown in FIGS. 1a and 1b, on one side, the fiber passageway 112 is delimited by a portion of the first sidewall 12 of the first module 11, while the other sides of the fiber passageway 112 are free from walls. At the fiber passageway, the first module 1, for example, comprises a fiber tension release tab or "anti-pull" tab 17 projecting from the first sidewall 12 towards the inside of the first module 1, namely towards the first portion 111 of the winding area. In an exemplary embodiment, the anti-pull tab 17 projects from the first sidewall 12 at an angle α comprised between about 30° and about 60° with respect to the first sidewall 12 towards the inside of the first module 1 (in other words, with respect to an axis parallel to the Y-axis of FIG. 1b). The anti-pull tab 17, for example, comprises, at its free end, a leg 171, such as a flexible leg, protruding towards the bottom surface of the fiber passageway 112. The anti-pull tab 17 is configured to retain the portions of the optical fiber elements entering and exiting the cassette through the fiber passageway 112. The anti-pull tab 17, for example, is, flexible in that it can be moved upwardly and then return in its rest position when released. In particular, during operation, the anti-pull tab 17 is flexed by pulling the tab upwards (i.e., away from the fiber passageway 112) in order to place the optical fiber elements underneath.

In an exemplary embodiment, an opening, shaped in the same way as the anti-pull tab 17, is provided in the surface of the fiber passageway 112.

The first module 1, for example, comprises fixing elements configured to be releasably connected to corresponding fixing elements of the second module or to corresponding first fixing elements of the third module, as it will be described hereinafter.

The fixing elements of the first module 1, for example, comprise first clip components 181 arranged in the free end of the first straight lateral portion 121 of the first sidewall 12 at the free edge 14 of the first module 1, second clip components 182 arranged at the free end of the straight lateral portion of the second sidewall 13 at the free edge 14 of the first module 1, and third clip components 183 arranged at substantially the middle of the free edge 14. Each of the first clip components, the second clip components, and the third clip components is configured to engage with corresponding components in the second module or the third module to form a first clip, a second clip, and a third clip, respectively, to releasably associate the first module with the second module or the third module, as it will be described hereinafter.

The first clip components 181 and the second clip components 182 are located, for example, at the opposite ends of the free edge 14 of the first module 1. Each set of clip components 181, 182 comprises a respective hook 181a, 182a, which is formed at the free end of the respective sidewall and projects therefrom, and a respective recess 181b, 182b, which is formed in the free edge 14 of the first module 1 in close proximity to the respective hook 181a, 182a, each pair of hook and recess forming a respective slot configured to engage with a corresponding fastener located in a free edge of the second module or the third module to releasably associate the first module 1 with the second module or the third module, respectively, as it will be described hereinafter.

Moreover, the first clip components 181, for example, comprise a first hole 181c, such as a rectangular hole, in the first straight lateral portion 121 of the first sidewall 12, in the proximity of its free end; similarly, the second clip components 182 comprises a second hole 182c, such as a rectangular hole, in the straight lateral portion of the second sidewall 13, in the proximity of its free end at the free edge 14. Each hole 181c, 182c, for example, is, configured to engage with a corresponding hook projecting from a respective end of a free edge of the second module or the third module to releasably associate the first module 1 with the second module or the third module, respectively, as it will be described hereinafter.

Furthermore, the third clip components 183, for example, comprises one or more, such as a pair, of parallel elongated fasteners 183a, 183b located on the outer flat surface 153 of the portion 15 of the mandrel and projecting outwards. The fasteners 183a, 183b shown in FIGS. 1a and 1b have a T-shaped cross section. In an exemplary embodiment, the fasteners 183a, 183b are configured to engage with corresponding slots present on an outer flat surface of another portion of the mandrel located in the second module or the third module, to releasably associate the first module 1 with the second module or the third module, as it will be described hereinafter. Between the fasteners 183a and 183b, the third clip components 183, for example, also comprise a slot 183c formed in the outer flat surface 153 of the portion 15 of the mandrel, which is configured to engage with a corresponding fastener formed in the outer flat surface of another portion of the mandrel comprised in the second module or the third module, as it will be described hereinafter.

In the embodiment shown in FIGS. 1a and 1b, the first sidewall 12 of the first module 1, for example, comprises, in the proximity of the fiber passageway 112, at its free end, a pivot element 19 to pivot the cassette around a pivot axis perpendicular to the bottom surface of the cassette (or, in other words, parallel to the Z-axis). The pivot element 19, for example, is a pivot pin. The pivot pin 19 may be in the form of a cylinder having a diameter of a few millimeters, for instance 6.9 mm, and it may be placed within the thickness of the first sidewall 12, at a distance of a few millimeters (e.g., 5.5 mm) from an inner surface of the sidewall 12 (namely, a surface that is facing the fiber passageway 112). The pivot pin 19 of the first module 1 shown in FIGS. 1a and 1b is configured to engage with a corresponding slot (not shown in the figures) comprised in the frame of an optical joint closure, to pivotally install the cassette within the optical joint closure, as it will be described in greater detail hereinafter.

Figure 2A:
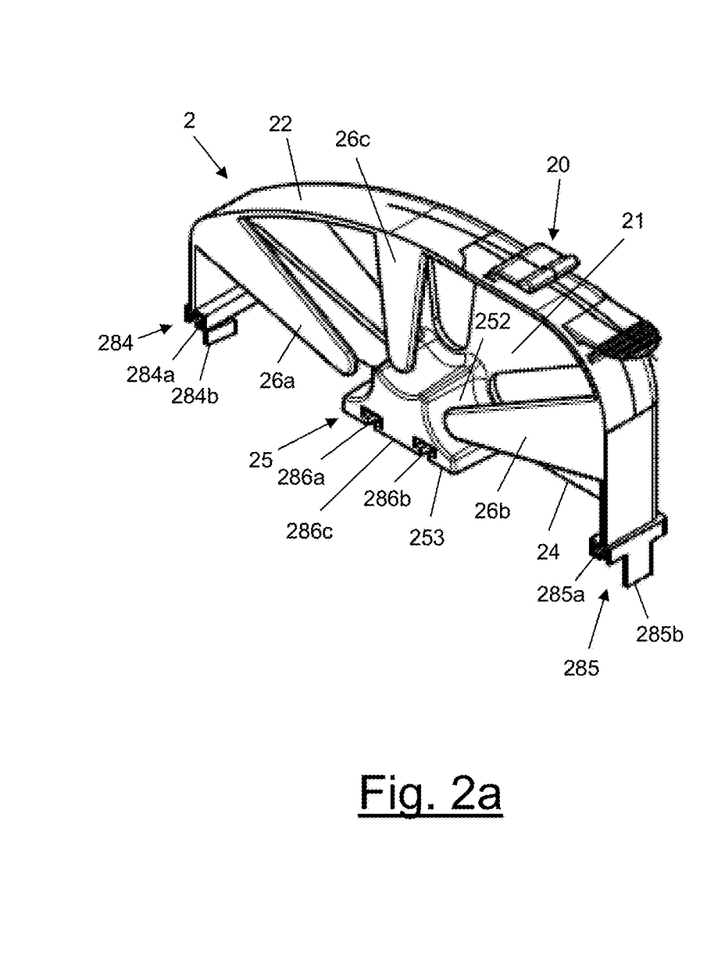
FIG. 2a is an axonometric view of a second module of the fiber management cassette according to an exemplary embodiment of the present invention.
Figure 2B:
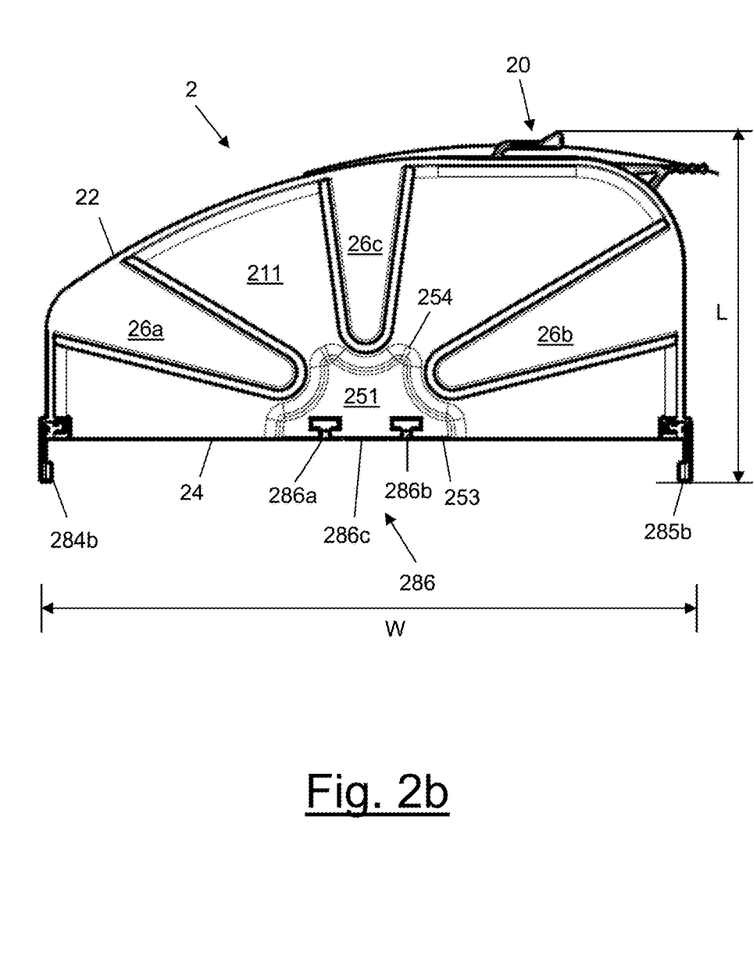

FIGS. 2a and 2b show the second module 2. The second module 2, for example, comprises a substantially flat bottom surface 21 and a sidewall 22 comprising straight and curved portions. It further comprises a substantially straight free edge 24 along which the second module 2 may be connected to the first module 1 or to the third module, as it will be described hereinafter.

The curved portions of the sidewall 22 may have a radius greater than a minimum bend radius of the considered optical fibers, such as greater than about 15 mm, as already discussed above with reference to the first module 1.

The second module 2 comprises a second portion 211 of the winding area of the cassette. The second portion 211 of the winding area, for example, comprises a portion 25 of a mandrel, which is positioned at the free edge 24 of the second module 2 substantially in the middle thereof. The portion 25 of the mandrel comprises an upper surface 251, an outer lateral wall 252 and an outer flat surface 253 at the free edge 24 of the second module 2. In the exemplary embodiment shown in FIGS. 2a and 2b, the upper surface 251 of the portion 25 of the mandrel is delimited by an edge 254 which comprises a first portion that is shaped substantially in the form of a number (e.g., three) of arcs of a circle, and a second straight portion at the free edge 24 of the first module. The outer lateral wall 252 of the portion 25 of the mandrel comprises a number (e.g., three) of elongated grooves extending along the height of the portion 25 of the mandrel and corresponding to the arcs of a circle along the edge 254 of the upper surface 251 of the portion 25 of the mandrel. The outer flat surface 253 of the portion 25 of the mandrel, for example, may be adapted to correspond to the outer flat surface 153 of the portion 15 of the mandrel in the first module 15, so that when the first module 1 and the second module 2 are connected to each other the two portions form a mandrel, around which the optical fiber elements may be wound, as it will be further discussed hereinafter.

In an exemplary embodiment, the second module 2 further comprises retaining tabs, such as flexible retaining tabs, configured to retain the loops of optical fiber elements. In particular, in the exemplary embodiment shown in FIGS. 2a and 2b, the second module 2 comprises a first retaining tab 26a, a second retaining tab 26b, and a third retaining tab 26c extending from the sidewall 22. The retaining tabs 26a, 26b, 26c extend, for example, from the sidewall 22 towards the portion 25 of the mandrel. Each retaining tab 26a, 26b, 26c extends, for example, from the respective sidewall towards a corresponding groove of the outer lateral wall 252 of the portion 25 of the mandrel so that the free end of each retaining tab 26a, 26b, 26c terminates in the proximity of said groove.

The retaining tabs 26a, 26b, 26c are flat and extend parallel to the bottom surface of the second portion 211 of the winding area. Additionally, the retaining tabs 26a, 26b, 26c are located, for example, at substantially the same height as the upper surface 251 of the portion 25 of the mandrel. In an exemplary embodiment, openings shaped in the same way as the retaining tabs are provided in the bottom surface of the second portion 211 of the winding area.

The second module 2, for example, comprises fixing elements configured to be releasably connected to the corresponding fixing elements of the first module or to corresponding second fixing elements of the third module, as it will be described hereinafter.

The fixing elements of the second module 2, for example, comprise first clip components 284 arranged in a first free end of the sidewall 22 at the free edge 24 of the second module 2, second clip components 285 arranged at a second free end of the sidewall 22 at the free edge 24 of the second module 2, and third clip components 286 arranged at substantially the middle of the free edge 24. Each of the first clip components, the second clip components, and the third clip components are configured to engage with the corresponding clip components in the first module.

The first clip components 284 and the second clip components 285 are located, for example, at the opposite sides of the free edge 24 of the second module 2. Each set of clip components 284, 285 comprises a respective elongated fastener 284a, 285a, which is formed at the free end of the respective sidewall, and a respective hook 284b, 285b, which projects from the respective free end of the sidewall. Each protuberance 284a, 285a is configured to engage with the corresponding hooks 181a, 182a and recesses 181b, 182b of the first module 1, while each hook 284b, 285b is configured to engage with the corresponding hole 181c, 182c in the sidewalls of the first module 1.

Furthermore, the third clip components 286, for example, comprise one or more, such as a pair, of parallel elongated slots 286a, 286b formed in the outer flat surface 253 of the portion 25 of the mandrel. The slots 286a, 286b shown in FIGS. 2a and 2b have a substantially T-shaped cross-section. In an exemplary embodiment, the slots 286a, 286b are configured to engage with the corresponding fasteners 183a, 183b located on the outer flat surface 153 of the portion 15 of the mandrel of the first module 1. The third clip components 286, for example, also comprise an elongated fastener 286c formed in the outer flat surface 253 of the portion 25 of the mandrel between the slots 286a, 286b, which is configured to slide in the corresponding slot 183c formed in the outer flat surface 153 of the portion 15 of the mandrel comprised in the first module 1.

Furthermore, the second module 2 may optionally comprise a rotation lock 20 to lock the cassette in a storage position into the optical joint closure when rotated upwards after being loaded with the optical fiber elements, as it will be better described hereinafter.

The third module 3 may have a rectangular shape. For example, third module 3 comprises a substantially flat bottom surface 31, and four sides comprising: a substantially straight first sidewall 32, a substantially straight second sidewall 33 opposite to said first sidewall 32, a first substantially straight free edge 34a along which the third module 3 may be connected to the first module 1, and a second substantially straight free edge 34b along which the third module 3 may be connected to the second module 2.

The third module 3 comprises a third portion 311 of the winding area of the cassette. The third portion 311 of the winding area, for example, comprises two portions 35a, 35b of respective mandrels, each portion 35a, 35b being positioned at a respective free edge 34a, 34b of the third module 3 substantially in the middle thereof.

Each portion 35a, 35b of the mandrel comprises an upper surface 351a, 351b, an outer lateral wall 352a, 352b, and an outer flat surface 353a, 353b at the respective free edge 34a, 34b of the third module. In the embodiment shown in FIGS. 3a and 3b, the upper surface 351a, 351b of each portion 35a, 35b of the mandrel comprises a respective tab 355a, 355b projecting towards the inside of the third module 3, in particular towards a channel that is formed between the portions 35a, 35b of the mandrel for the passage of the loops of optical fiber elements. In an exemplary embodiment, openings shaped in the same way as the tabs 355a, 355b are provided in the bottom surface of the third portion 311 of the winding area of the third module 3. Each upper surface 351a, 351b is delimited by an edge 354a, 354b which comprises curved portions in the form of a number (e.g., two) of arcs of a circle. The outer lateral wall 352a, 352b of each portion 35a, 35b of a mandrel comprises a number (e.g., two) of elongated grooves extending along the height of the portion of the mandrel and corresponding to the arcs of a circle along the edge 353a, 354b of the upper surface of the mandrel.

The outer flat surface 353a, 353b of each portion 35a, 35b of the mandrel, for example, is, adapted to correspond to, respectively, the outer flat surface 153 of the portion 15 of the mandrel in the first module 1, and the outer flat surface 253 of the portion 25 of the mandrel in the second module 2. In this way, when the first module 1 and the second module 2 are connected to the third module 3, at opposite sides thereof (namely, at the first free edge 34a and the second free edge 34b, respectively), two mandrels are formed, around which the optical fiber elements may be wound. As it will be cleared from the following description, a channel is also formed between the couple of mandrels, wherein tabs 355a, 355b may be used to retain the optical fiber elements in position.

In an exemplary embodiment, the third module 3 further comprises retaining tabs, such as flexible retaining tabs, configured to retain the loops of optical fiber elements in the winding area. In particular, in the embodiment shown in FIGS. 3a and 3b, the second module 2 comprises four retaining tabs 36a, 36b, 36c, 36d extending from the sidewalls 32, 33. The retaining tabs 36a, 36b, 36c, 36d extend, for example, from the sidewalls 32, 33 towards the portions 35a, 35b of the mandrel. Each retaining tab 36a, 36b, 36c, 36d extends, for example, from the respective sidewall towards a corresponding groove of the outer lateral wall 352a, 352b of the portions 35a, 35b of the mandrel so that the free end of each retaining tab 36a, 36b, 36c, 36d terminates in the proximity of said groove.

The retaining tabs 36a, 36b, 36c, 36d are flat and extend parallel to the bottom surface of the third portion 311 of the winding area. Additionally, the retaining tabs 36a, 36b, 36c, 36d are located, for example, at substantially the same height as the upper surface 351a, 351b of the portions 35a, 35b of the mandrel. In an exemplary embodiment, openings shaped in the same way as the retaining tabs are provided in the bottom surface of the third portion 311 of the winding area of the third module 3.

The third module 3, for example, comprises first fixing elements configured to be releasably connected to the corresponding fixing elements of the first module 1 and second fixing elements configured to be releasably connected to the corresponding fixing elements of the second module 2, as it will be described hereinafter.

The first fixing elements of the third module 3, for example, comprise first clip components 384 arranged at a free end of the first sidewall 32 at the first free edge 34a of the third module 3, second clip components 385 arranged at a free end of the second sidewall 33 at the first free edge 34a of the third module 3, and third clip components 386 arranged at substantially the middle of the first free edge 34a.

The first clip components 384, the second clip components 385, and the third clip components 386 of the first fixing elements of the third module 3, for example, substantially correspond to the first clip components 284, the second clip components 285, and the third clip components 286 of the fixing elements of the second module 2. Hence, a detailed description of the first fixing elements of the third module 3 will be omitted. In FIGS. 3a and 3b, the clip components of the first fixing elements of the third module 3 have been indicated by using reference numbers that correspond to the reference number used in FIGS. 2a and 2b for the clip components of the fixing elements of the second module 2.

The second fixing elements of the third module 3, for example, comprise first clip components 381 arranged at a free end of the first sidewall 32 at the second free edge 34b of the third module 3, second clip components 382 arranged at a free end of the second sidewall 33 at the second free edge 34b of the third module 3, and third clip components 383 arranged at substantially the middle of the second free edge 34b.

The first clip components 381, the second clip components 382, and the third clip components 383 of the second fixing elements of the third module 3, for example, substantially correspond to the first clip components 181, the second clip components 182, and the third clip components 183 of the fixing elements of the first module 1. Hence, a detailed description of the second fixing elements of the third module 3 will be omitted. In FIGS. 3a and 3b, the clip components of the second fixing elements of the third module 3 have been indicated by using reference numbers that correspond to the reference number used in FIGS. 1a and 1b for the clip components of the fixing elements of the first module 1.

Each of the first module 1, the second module 2, and the third module 3, for example, is, made in one piece by molding from a plastic material. The plastic material used can be, for example, ABS (acrylonitrile-butadiene-styrene).

With reference to the module dimensions indicated in FIG. 1b, the first module 1 has, for instance, a width W of a few hundred millimeters, in particular it may range between 60 mm and 200 mm; an exemplary value may be 176.6 mm. The first module 1 may have a length L of a few hundred millimeters, in particular ranging between 90 mm and 170 mm; an exemplary value may be 143.5 mm. The thickness of the first module 1 (corresponding to the height of the sidewalls) may range between 10 mm and 30 mm. Exemplarily, the first module 1 may have width W equal to about 176.6 mm, length L equal to about 143.5 mm, and thickness equal to about 25 mm.

With reference to the module dimensions indicated in FIG. 2b, the second module has for instance a width W of a few hundred millimeters, in particular it may range between 60 mm and 200 mm. The second module 2 may have a length L of a few hundred millimeters in particular ranging between 75 mm and 150 mm; an exemplary value may be 80 mm. The thickness of the second module 2 (corresponding to the height of the sidewalls) may range between 10 mm and 30 mm. Exemplarily, the second module 2 may have width W equal to about 176.6 mm, length L equal to about 80 mm, and thickness equal to about 25 mm.

With reference to the module dimensions indicated in FIG. 3b, the third module 3 has, for instance, a width W of a few hundred millimeters, in particular it may range between 60 mm and 200 mm. The third module 3 may have a length L of a few hundred millimeters, in particular it may range between 100 mm and 130 mm. The thickness of the third module 3 (corresponding to the height of the sidewalls) may range between 10 mm and 30 mm.

FIG. 4 schematically shows an exemplary fiber management cassette 400 according to the present invention. The fiber management cassette 400 comprises the first module 1, the second module 2 and the third module 3 interposed between the first module 1 and the second module 2. The first module 1 is connected to the third module 3 by juxtaposing the free edge 14 of the first module 1 with the first free edge 34a of the third module 3 and engaging the fixing elements of the first module 1 with the first fixing elements of the third module 3. In particular, a first clip 401, a second clip 402, and a third clip 403 are formed by sliding the fasteners of the clip components of each of the first module 1 and third module 3 into the corresponding slots of the clip components of the other module (namely, with reference to FIGS. 1a, 1b, 3a, and 3b, the fasteners 384a, 385a into the slots formed by the hook and recess pairs 181a, 181b and 182a, 182b; the fastener 386c into the slot 183c; the fasteners 183a, 183b into the slots 386a, 386b), and fixing the hooks 384b, 385b at the opposite sides of the first free edge 34a of the third module 3 into the corresponding holes 181c, 182c present at the opposite sides of the free edge 14 of the first module 1. The clips allow to releasably connect the modules in a very simple manner.

Similarly, the second module 2 is connected to the third module 3 by juxtaposing the free edge 24 of the second module 2 with the second free edge 34b of the third module 3 and engaging the fixing elements of the second module 2 with the second fixing elements of the third module 3. In particular, a further first clip 401', a further second clip 402' and a further third clip 403' are formed by sliding the fasteners of the clip components of each of the third module 3 and second module 2 into the corresponding slots of the clip components of the other module (namely, the fasteners 284a, 285a into the slots formed by the hook and recess pairs 381a, 381b and 382a, 382b; the fastener 286c into the slot 383c; the fasteners 383a, 383b into the slots 286a, 286b), and fixing the hooks 284b, 285b at the opposite sides of the free edge 24 of the second module 2 into the corresponding holes 381c, 382c present at the opposite sides of the second free edge 34b of the third module 3.

Once the modules are connected, a winding area is formed by the juxtaposition of the first portion 111, the second portion 211, and the third portion 311. Moreover, a first mandrel 404 is formed by the juxtaposition of the portion 15 of the mandrel of the first module 1 and the portion 35a of the mandrel of the third module 3, and a second mandrel 404' is formed by the juxtaposition of the portion 35b of the mandrel of the third module 3 and the portion 25 of the mandrel of the second module 2.

FIG. 5 shows the exemplary fiber management cassette 400 of FIG. 4 and a possible arrangement of an optical fiber element loop 500. As schematically illustrated in FIG. 5, the optical fiber element loop 500 is arranged in the winding area of the fiber management cassette 400 by routing the optical fiber elements along the boundary of the cassette, for instance in a clockwise direction. The optical fiber elements are retained under the flexible retaining tabs of the modules. The optical fiber elements may also be wound around the mandrels, in particular they may be routed between the mandrels 404 and 404'. The portions of the optical fiber elements entering and exiting the fiber management cassette 400 (these portions are indicated with reference numbers 501 and 502 in FIG. 5) are retained under the anti-pull tab.

Figure 6:
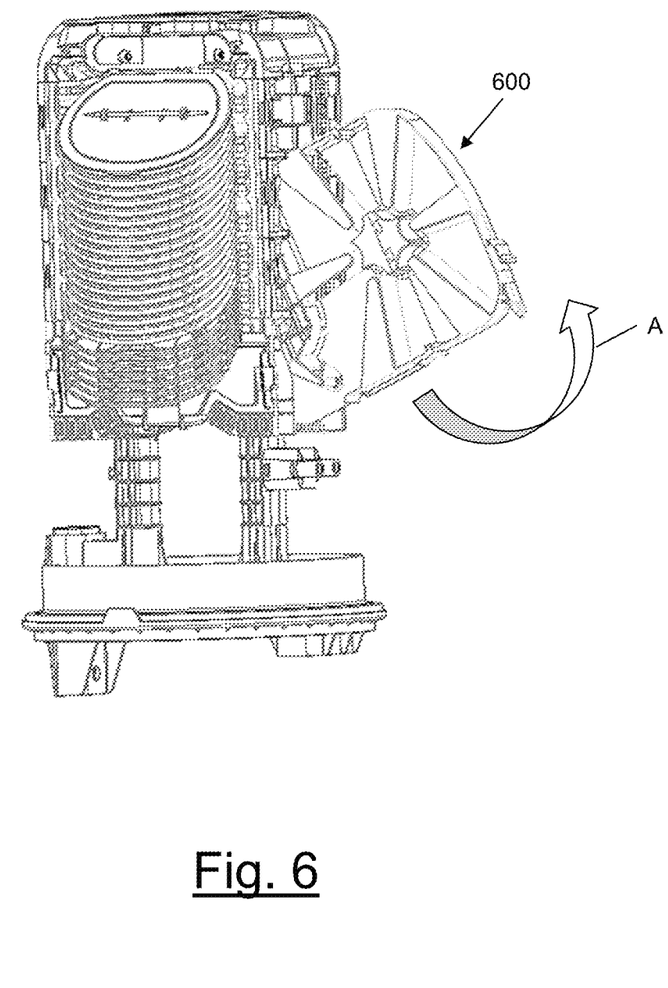
FIG. 6 schematically shows an optical joint closure comprising a fiber management cassette coupled thereto.

FIG. 6 schematically shows a fiber management cassette 600 according to another exemplary embodiment of the present invention. The fiber management cassette 600 is installed in an optical joint closure. The fiber management cassette 600 is formed by the first module 1 and the second module 2. It is pivotally inserted into the optical joint closure by the pivot pin 19 of the first module 1 shown in FIGS. 1a and 1b. In particular, after assembling the cassette 600 by connecting together the first module 1 and the second module 2 by their fixing elements, the pivot pin is inserted into a slot comprised in the frame of the optical joint closure so that the cassette 600 may be pivoted upwards into the optical joint closure as shown in FIG. 6. The direction of this pivoting operation is indicated with arrow A. The cassette 600 may then rotate between a loading position and a storage position (not shown in the drawings). In the loading position, the cassette is rotated downwards outside the closure so that an operator may arrange the loops of optical fiber elements in the winding area of the cassette as shown in FIG. 5. In the storage position, the cassette is rotated upwards in a substantially vertical position inside the optical joint closure to store the loops of optical fiber elements therein. The cassette 600 may also be removed from the optical joint closure by disengaging the pivot pin from the slot of the closure frame into which it is inserted.

Advantageously, the fiber management cassette according to the present invention may be adapted to arrange loops of optical fiber elements of different sizes thanks to its modularity. Indeed, a cassette of a minimum size may be formed by simply connecting together the first module and the second module described above, but the possibility of interposing one or more further modules between the first module and the second module allows forming cassettes of different sizes that can easily meet the needs of the operators. For example, the fiber management cassette according to the present invention may be potentially installed in every optical joint closure of the type schematically shown in FIG. 6 as currently available on the market (e.g., small size, medium size, large size), and can be potentially extended to be installed in even larger closures by simply adding further modules. Moreover, as discussed above, the connection between the modules is performed in a very simple manner thanks to the presence of the releasable clips. The choice of the number of modules to be connected together may hence be performed directly on the field during the installation of the cassette by considering the actual length of the optical fiber elements to be arranged in the cassette.

To supplement the present disclosure, this application incorporates entirely by reference commonly assigned U.S. patent application Ser. No. 16/677,002 for a Fiber Management Cassette (concurrently filed Nov. 7, 2019), now U.S. Pat. No. 11,048,056, which claims priority to Italian Application No. 102018000010175 (filed Nov. 8, 2018, at the Italian Patent and Trademark Office).

OTHER ASPECTS AND EMBODIMENTS

The foregoing detailed description and accompanying figures set forth typical embodiments of fiber management cassettes. The present disclosure is not limited to such exemplary embodiments. It will be apparent that numerous other embodiments may be provided in accordance with the present disclosure. The present disclosure may utilize any variety of aspects, features, or steps, or combinations thereof. The figures may be schematic representations that are not necessarily drawn to scale.

It is within the scope of this disclosure for one or more of the terms "substantially," "about," "approximately," and/or the like, to qualify each adjective and adverb of the foregoing disclosure, to provide a broad disclosure. As an example, it is believed those of ordinary skill in the art will readily understand that, in different implementations of the features of this disclosure, reasonably different engineering tolerances, precision, and/or accuracy may be applicable and suitable for obtaining the desired result. Accordingly, it is believed those of ordinary skill will readily understand usage herein of the terms such as "substantially," "about," "approximately," and the like.

The figures are schematic representations and so are not necessarily drawn to scale. Unless otherwise noted, specific terms have been used in a generic and descriptive sense and not for purposes of limitation.

While various aspects, features, and embodiments have been disclosed herein, other aspects, features, and embodiments will be apparent to those having ordinary skill in the art. The various disclosed aspects, features, and embodiments are for purposes of illustration and are not intended to be limiting. It is intended that the scope of the present invention includes at least the following claims and their equivalents:

The invention claimed is:

1. A fiber management cassette for storing loops of one or more optical fiber elements, the cassette comprising:
a first module comprising a first portion of a winding area and first fixing elements; and
a second module comprising a second portion of said winding area and second fixing elements;
wherein said first fixing elements are configured to engage with said second fixing elements for releasably interconnecting said first module and said second module and to join said first portion and said second portion to form said winding area, said winding area being configured to store said loops of one or more optical fiber elements;
wherein said first module comprises a fiber passageway allowing said optical fiber elements to enter and exit said fiber management cassette; and
wherein said first module comprises a first portion of a mandrel for routing said optical fiber elements in said winding area, wherein said second module comprises a second portion of said mandrel, said mandrel being formed once said first module and said second module are releasably interconnected by said first fixing elements and said second fixing elements, wherein said first portion of said mandrel is positioned in said first portion of said winding area, and wherein said second portion of said mandrel is positioned in said second portion of said winding area.

2. The fiber management cassette according to claim 1, comprising a third module configured to be connected between the first module and the second module, said third module comprising:
a third portion of said winding area;
further first fixing elements; and
further second fixing elements;
wherein said further first fixing elements are configured to engage with said first fixing elements for releasably interconnecting said third module and said first module and to join said first portion and said third portion of said winding area; and
wherein said further second fixing elements are configured to engage with said second fixing elements for releasably interconnecting said third module and said second module and join said third portion and said second portion of said winding area.

3. The fiber management cassette according to claim 2, wherein:
said first fixing elements comprise:
first clip components arranged at a first end of a free edge of said first module,
second clip components arranged at a second end of said free edge, and
third clip components arranged at the middle of said free edge; and
said second fixing elements comprise:
first clip components arranged at a first end of a free edge of said second module and configured to engage with said first clip components of said first module to form a first clip when said first module and said second module are releasably interconnected,
second clip components arranged at a second end of said free edge of said second module and configured to engage with said second clip components of said first module to form a second clip when said first module and said second module are releasably interconnected, and
third clip components arranged at the middle of said free edge of said second module and configured to engage with said third clip components of said first module to form a third clip when said first module and said second module are releasably interconnected.

4. The fiber management cassette according to claim 3, wherein said further first fixing elements comprise first clip components, second clip components, and third clip components corresponding to, respectively, said first clip components, said second clip components, and said third clip components of said second module, and wherein said further second fixing elements comprise first clip components, second clip components, and third clip components corresponding to, respectively, said first clip components, said second clip components, and said third clip components of said first module.

5. The fiber management cassette according to claim 1, wherein said first module and said second module comprise retaining tabs configured to retain said loops of optical fiber elements in said winding area.

6. The fiber management cassette according to claim 1, wherein said first module comprises, at said fiber passageway, an anti-pull tab projecting from a sidewall of said first module towards said first portion of said winding area, the anti-pull tab being configured to retain portions of said optical fiber elements entering and exiting said fiber management cassette through said fiber passageway.

7. The fiber management cassette according to claim 6, wherein said anti-pull tab comprises, at a free end thereof, a leg protruding towards a bottom surface of said fiber passageway.

8. The fiber management cassette according to claim 1, wherein said first module comprises, in the proximity of said fiber passageway, a pivot element to pivot said fiber management cassette around a pivot axis perpendicular to a bottom surface of said fiber management cassette.

9. An optical joint closure comprising the fiber management cassette according to claim 8, wherein said fiber management cassette is connected to a frame of said optical joint closure by said pivot element.

10. The fiber management cassette according to claim 1, wherein:
said first fixing elements comprise:
first clip components arranged at a first end of a free edge of said first module,
second clip components arranged at a second end of said free edge, and
third clip components arranged at the middle of said free edge; and
said second fixing elements comprise:
first clip components arranged at a first end of a free edge of said second module and configured to engage with said first clip components of said first module to form a first clip when said first module and said second module are releasably interconnected,
second clip components arranged at a second end of said free edge of said second module and configured to engage with said second clip components of said first module to form a second clip when said first module and said second module are releasably interconnected, and third clip components arranged at the middle of said free edge of said second module and configured to engage with said third clip components of said first module to form a third clip when said first module and said second module are releasably interconnected.

11. A fiber management cassette for storing loops of one or more optical fiber elements, the cassette comprising:
a first module comprising a first portion of a winding area, first fixing elements, and a fiber passageway allowing said optical fiber elements to enter and exit said fiber management cassette;
a second module comprising a second portion of said winding area and second fixing elements; and
a third module comprising a third portion of said winding area, further first fixing elements, and further second fixing elements;
wherein said first fixing elements are configured to engage with said second fixing elements for releasably interconnecting said first module and said second module and to join said first portion and said second portion to form said winding area, said winding area being configured to store said loops of one or more optical fiber elements;
wherein said further first fixing elements are configured to engage with said first fixing elements for releasably interconnecting said third module and said first module and to join said first portion and said third portion of said winding area;
wherein said further second fixing elements are configured to engage with said second fixing elements for releasably interconnecting said third module and said second module and join said third portion and said second portion of said winding area;
wherein said first fixing elements comprise first clip components arranged at a first end of a free edge of said first module, second clip components arranged at a second end of said free edge, and third clip components arranged at the middle of said free edge;
wherein said second fixing elements comprise:
first clip components arranged at a first end of a free edge of said second module and configured to engage with said first clip components of said first module to form a first clip when said first module and said second module are releasably interconnected,
second clip components arranged at a second end of said free edge of said second module and configured to engage with said second clip components of said first module to form a second clip when said first module and said second module are releasably interconnected, and
third clip components arranged at the middle of said free edge of said second module and configured to engage with said third clip components of said first module to form a third clip when said first module and said second module are releasably interconnected;
wherein said further first fixing elements comprise first clip components, second clip components, and third clip components corresponding to, respectively, said first clip components, said second clip components, and said third clip components of said second module; and
wherein said further second fixing elements comprise first clip components, second clip components, and third clip components corresponding to, respectively, said first clip components, said second clip components, and said third clip components of said first module.

12. A fiber management cassette for storing loops of one or more optical fiber elements, the cassette comprising:
a first module comprising a first portion of a winding area, first fixing elements, a fiber passageway allowing said optical fiber elements to enter and exit said fiber management cassette, and a first portion of a mandrel for routing said optical fiber elements in said winding area; and
a second module comprising a second portion of said winding area, second fixing elements, and a second portion of said mandrel;
wherein said first fixing elements are configured to engage with said second fixing elements for releasably interconnecting said first module and said second module and to join said first portion and said second portion to form said winding area, said winding area being configured to store said loops of one or more optical fiber elements, and said mandrel being formed once said first module and said second module are releasably interconnected by said first fixing elements and said second fixing elements.

13. The fiber management cassette according to claim 12, wherein:
said first fixing elements comprise:
first clip components arranged at a first end of a free edge of said first module,
second clip components arranged at a second end of said free edge, and
third clip components arranged at the middle of said free edge; and
said second fixing elements comprise:
first clip components arranged at a first end of a free edge of said second module and configured to engage with said first clip components of said first module to form a first clip when said first module and said second module are releasably interconnected,
second clip components arranged at a second end of said free edge of said second module and configured to engage with said second clip components of said first module to form a second clip when said first module and said second module are releasably interconnected, and
third clip components arranged at the middle of said free edge of said second module and configured to engage with said third clip components of said first module to form a third clip when said first module and said second module are releasably interconnected.

14. The fiber management cassette according to claim 12, comprising a third module comprising:
a third portion of said winding area;
further first fixing elements; and
further second fixing elements;
wherein said further first fixing elements are configured to engage with said first fixing elements for releasably interconnecting said third module and said first module and to join said first portion and said third portion of said winding area; and
wherein said further second fixing elements are configured to engage with said second fixing elements for releasably interconnecting said third module and said second module and join said third portion and said second portion of said winding area.

15. The fiber management cassette according to claim 14, wherein:
said first fixing elements comprise:
first clip components arranged at a first end of a free edge of said first module,
second clip components arranged at a second end of said free edge, and
third clip components arranged at the middle of said free edge; and
said second fixing elements comprise:
first clip components arranged at a first end of a free edge of said second module and configured to engage with said first clip components of said first module to form a first clip when said first module and said second module are releasably interconnected,
second clip components arranged at a second end of said free edge of said second module and configured to engage with said second clip components of said first module to form a second clip when said first module and said second module are releasably interconnected, and
third clip components arranged at the middle of said free edge of said second module and configured to engage with said third clip components of said first module to form a third clip when said first module and said second module are releasably interconnected.

16. The fiber management cassette according to claim 15, wherein said further first fixing elements comprise first clip components, second clip components, and third clip components corresponding to, respectively, said first clip components, said second clip components, and said third clip components of said second module, and wherein said further second fixing elements comprise first clip components, second clip components, and third clip components corresponding to, respectively, said first clip components, said second clip components, and said third clip components of said first module.

* * * * *